Patented Aug. 22, 1944

2,356,259

UNITED STATES PATENT OFFICE 2,356,259

METHODS AND MEANS FOR STORING AND CONCENTRATING ANHYDROUS HYDROGEN CHLORIDE

Aylmer H. Maude and David S. Rosenberg, Niagara Falls, N. Y., assignors to Hooker Electrochemical Company, Niagara Falls, N. Y., a corporation of New York No Drawing. Application December 18, 1941, Serial No. 423,444

6 Claims. (Cl. 252—299)

It is known that certain metallic salts form addition compounds with anhydrous hydrogen chloride and that the hydrogen chloride may be subsequently recovered for use as required by application of heat to the compound. However, when dehydrated, the salts having the properties necessary for this purpose are generally powdery and hygroscopic. Carrying out of the absorption and desorption of the hydrogen chloride therefore involves considerable difficulty.

In U. S. Patent No. 2,234,738, there is disclosed a method and means for overcoming this difficulty, which comprises impregnating inert porous granular material, or plastic material, with an aqueous solution of the salt, and then driving off the water, so as to leave the salt distributed throughout the material. If the material were originally plastic it is rendered porous by expulsion of the water. It is then baked to a solid block. The material thus impregnated is enclosed in an air tight container, thus excluding moisture. In the patent, the materials mentioned as suitable for impregnation are "Alfrax," "Alundum," pumice and clay. The first two of these materials are commercial forms of aluminum oxide. The last two are mixtures of silicates, largely of aluminum. All four of these materials, therefore, contain aluminum. In the patent it is stated that these materials last indefinitely. However, with further experience it has been found that the aluminum slowly chlorinates and after repeated use for prolonged periods the absorptive mass tends to deteriorate and lose capacity to absorb hydrogen chloride and re-evolve it at high efficiency. We have therefore sought to find an inert porous material that will serve the purpose intended for a still longer period.

We have now found that infusorial earth, variously known as "diatomaceous earth," "fossil flour," "Tripolite," "Terra Silica," "Sil-o-cel," "kieselguhr," etc., is a very superior material for our purpose. This material is composed of the skeletal remains of microscopic plant life. It occurs in the form of blocks or powder. The powder may be compacted into blocks or bricks by the use of a suitable binder, preferably aided by pressure. The material itself being largely silica. Sodium silicate is very well adapted to serve as a binder for this purpose. The natural material in block form lacks mechanical strength and disintegrates in water. The artificially compacted material, however, has good mechanical strength. Its specific gravity is 0.24 to 0.34. It is manufactured and used for heat insulating purposes and is so porous that it will absorb four times its weight of water.

Among the salts known to form addition compounds with hydrogen chloride and give off the gas at higher temperature are certain salts of heavy metals, such as cupric chloride, copper, lead, cadmium, silver, mercury, tin, bismuth and antimony sulphate, phosphate, phosphite, and hypophosphite and thallium and ferric phosphate. Many of these salts are heavy or expensive, or give off the HCl at inconveniently high temperatures. Copper, lead and stannous sulphates form the stable addition compounds $CuSO_4.2HCl$, $PbSO_4.2HCl$ and $SnSO_4.1.5HCl$.

The temperatures at which these compounds begin to give up the HCl depend upon the degree of saturation, but at atmospheric pressure, and in an atmosphere of HCl, they will be found to have given up most of the HCl at 130° C. These salts are therefore at present among the preferred salts of our purpose.

We have found that after dehydration, infusorial earth will take up 1½ times its weight of copper sulphate. It may be impregnated in powdered form and used in that form; or it may be compacted and granulated before impregnation and dehydration. In that case the granules should have a fineness of 8 to 20 mesh. The impregnated granular material may contain 31 lbs. of copper sulphate per cubic foot and this may absorb 14.2 lbs. of anhydrous hydrogen chloride. In order to introduce the maximum quantity of the salt, and thus to obtain the greatest absorptive capacity, the granular material is preferably saturated with the salt by boiling it in a saturated solution of the salt. It is then dried. When the salt is copper sulphate, it is preferably dried at 110° C., resaturated and redried at the same temperature, and then dehydrated at a temperature of about 250° C. A higher drying temperature impairs the absorptive properties of the material. Copper sulphate begins to decompose at 500° C. and is completely decomposed at 650° C.

It has been stated above that infusorial earth is largely silica in the form of silicon dioxide. It also contains minor proportions of alumina, magnesia, ferric oxide, potash, etc. However, the silica amounts to 85 to 95 per cent and the alumina is generally less than 5 per cent. The chlorination of alumina or other metals cannot therefore have any serious effect on the porosity or absorptive properties of the impregnated mass. In fact this material, if compacted by means of a binder of sodium silicate, may be boiled, before impregnation with the salt, in concentrated aqueous hydrochloric acid for hours without appreciable loss of weight.

The granular impregnated infusorial earth prepared in accordance with our process may be packed in air tight portable containers and these may be used for shipment of anhydrous hydrogen chloride, or it may be packed in large stationary air tight containers or compartments and used for concentration of dilute hydrogen chloride. When in granular form, the impregnated infusorial earth of the present invention may be used in the container of the patent referred to above. When in powdered form it may be used in the container of co-pending application Serial No. 423,445, filed simultaneously herewith. In general, when the material is to be used in a shipping container, we prefer to use it in powdered form. In that form it requires a longer time for charging, but for the purposes of shipment that is a secondary consideration. A more important consideration is the fact that in powdered form it takes up a greater weight of hydrogen chloride, for a container of given volume. When the material is to be used for concentrating dilute hydrogen chloride, on the other hand, times of charging and discharging are important; and since the material is more permeable in granular form, when it is to be used for concentrating the dilute gas we prefer to use it in that form. In that case the dilute gas is fed in through the mass of granular material and the diluent gases pass out at the other side.

The charging and discharging of the container may be facilitated by the use of pressure, as disclosed and claimed in co-pending application Serial No. 423,446, filed simultaneously herewith. The use of pressure is particularly effective if the material is in granular form.

We claim as our invention:

1. The method of preparing material suitable for use in storing or concentrating anhydrous hydrogen chloride without being materially affected by such use over a relatively prolonged period which comprises impregnating infusorial earth with a salt of the group consisting of copper sulphate, lead sulphate and stannous sulphate, by alternately boiling the infusorial earth with an aqueous solution of the salt and drying the resulting material, until the material has taken up substantially the maximum quantity of the salt that it is capable of holding on the surface and in the interstices of its particles, and dehydrating the resulting material below the decomposition temperature of the salt.

2. The method of preparing material suitable for use in storing or concentrating anhydrous hydrogen chloride, without being materially affected by such use over a relatively prolonged period, which comprises boiling infusorial earth with an aqueous solution of copper sulphate, drying the resulting mass at substantially 110° C., boiling it with an aqueous solution of copper sulphate again and again drying it at substantially 110° C. and finally dehydrating the impregnated mass at not over substantially 250° C.

3. The method of preparing material suitable for use in storing or concentrating anhydrous hydrogen chloride without being materially affected by such use over a relatively prolonged period which comprises granulating infusorial earth by means of an inert binder and impregnating the resulting material with a salt of the group consisting of copper sulphate, lead sulphate and stannous sulphate, by alternately boiling the material with an aqueous solution of the salt and drying the resulting material, until the material has taken up substantially the maximum quantity of the salt that it is capable of holding on the surface and in the interstices of its particles, and dehydrating the resulting material below the decomposition temperature of the salt.

4. The method of preparing material suitable for use in storing or concentrating anhydrous hydrogen chloride without being materially affected by such use over a relatively prolonged period which comprises consolidating infusorial earth by means of an inert binder and pressure, crushing and granulating the resulting mass, and impregnating the resulting material with a salt of the group consisting of copper sulphate, lead sulphate and stannous sulphate, by alternately boiling the material with an aqueous solution of the salt and drying the resulting material, until the material has taken up substantially the maximum quantity of the salt that it is capable of holding on the surface and in the interstices of its particles, and dehydrating the resulting material below the decomposition temperature of the salt.

5. The method of preparing material suitable for use in storing or concentrating anhydrous hydrogen chloride without being materially affected by such use over a relatively prolonged period which comprises impregnating infusorial earth with copper sulphate, by alternately boiling the infusorial earth with an aqueous solution of the salt and drying the resulting material, until the material has taken up substantially the maximum quantity of the salt that it is capable of holding on the surface and in the interstices of its particles, and dehydrating the resulting material below the decomposition temperature of the salt.

6. The method of preparing material suitable for use in storing or concentrating anhydrous hydrogen chloride without being materially affected by such use over a relatively prolonged period which comprises impregnating infusorial earth with copper sulphate, by alternately boiling the infusorial earth with an aqueous solution of the salt and drying the resulting material at a temperature between 100° and 250° C. until the material has taken up substantially the maximum quantity of the salt that it is capable of holding on the surface and in the interstices of its particles, and dehydrating the resulting material at a temperature below 500° C.

AYLMER H. MAUDE.
DAVID S. ROSENBERG.